United States Patent
Grushkowitz et al.

(10) Patent No.: US 10,469,025 B2
(45) Date of Patent: Nov. 5, 2019

(54) SOLAR-TRACKING SYSTEM DRIVE HAVING AN OFFSET GEAR

(71) Applicant: SUNPOWER CORPORATION, San Jose, CA (US)

(72) Inventors: Tyler Grushkowitz, Hayward, CA (US); Brian Wares, San Francisco, CA (US); Mark Adam Schimelpfenig, Hayward, CA (US); Jason C. Jones, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 203 days.

(21) Appl. No.: 15/254,976

(22) Filed: Sep. 1, 2016

(65) Prior Publication Data

US 2018/0062564 A1 Mar. 1, 2018

(51) Int. Cl.
| | |
|---|---|
| *H02N 6/00* | (2006.01) |
| *H01L 31/042* | (2014.01) |
| *H02S 20/32* | (2014.01) |
| *F16H 19/00* | (2006.01) |
| *F24S 30/425* | (2018.01) |
| *F24S 30/00* | (2018.01) |

(52) U.S. Cl.
CPC ........... *H02S 20/32* (2014.12); *F16H 19/001* (2013.01); *F24S 30/425* (2018.05); *F24S 2030/11* (2018.05); *F24S 2030/134* (2018.05); *F24S 2030/136* (2018.05); *F24S 2030/15* (2018.05); *Y02E 10/47* (2013.01)

(58) Field of Classification Search
CPC ... H02S 20/32; F24S 30/425; F24S 2030/136; F24S 2030/11; F24S 2030/134; F16H 19/001
See application file for complete search history.

(56) References Cited

U.S. PATENT DOCUMENTS

| | | | |
|---|---|---|---|
| 4,574,659 A | * | 3/1986 | Arndt ........................ F16H 1/32 475/174 |
| 8,459,249 B2 | | 6/2013 | Corio |
| 9,353,970 B2 | | 5/2016 | Linderman et al. |
| 2012/0216852 A1 | | 8/2012 | Almy et al. |
| 2014/0090637 A1 | | 4/2014 | Grushkowitz |
| 2014/0174430 A1 | | 6/2014 | Fitzgerald et al. |
| 2014/0182577 A1 | | 7/2014 | Linderman et al. |

(Continued)

OTHER PUBLICATIONS

Extended European Search Report from European Patent Application No. 17188452.1 dated Jan. 23, 2018, 8 pgs.

*Primary Examiner* — Angelo Trivisonno
(74) *Attorney, Agent, or Firm* — Schwabe, Williamson & Wyatt, P.C.

(57) ABSTRACT

A solar-tracking photovoltaic (PV) system having a motor drive vertically below a PV module, is described. In an example, the motor drive rotates a torque tube holding the PV module. The motor drive may include a gearbox having a worm drive, and a gearmotor having an offset gear. The offset gear may be coupled to a planetary gear train along an axis of a worm of the worm drive, and the offset gear may be coupled to a motor along a shaft axis offset vertically below the worm axis. Accordingly, the motor may be offset vertically below the worm drive, i.e., farther from the PV laminate than the worm drive, and a rotational clearance for the PV laminate may be increased.

19 Claims, 10 Drawing Sheets

(56) References Cited

U.S. PATENT DOCUMENTS

| | | |
|---|---|---|
| 2015/0000721 A1 | 1/2015 | Au |
| 2015/0000722 A1 | 1/2015 | Au |
| 2015/0082924 A1* | 3/2015 | Morgan ................ F16B 7/0493 74/89.14 |
| 2016/0003496 A1 | 1/2016 | Brenmiller et al. |
| 2016/0091051 A1 | 3/2016 | Morgan |
| 2016/0195303 A1 | 7/2016 | Lambert et al. |

* cited by examiner

SOLAR-TRACKING SYSTEM DRIVE HAVING AN OFFSET GEAR

BACKGROUND

Some sun-tracking solar power systems, such as utility-scale photovoltaic installations, are designed to pivot a large number of solar modules to track the movement of the sun. For example, sun-tracking solar power systems may include a row of solar modules supported on a torque tube. The torque tube may be driven by a motor drive to rotate the solar modules toward the sun.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" epicyclic gear stage does not necessarily imply that this gear stage is the first gear stage in a sequence; instead the term "first" is used to differentiate this gear stage from another gear stage (e.g., a "second" epicyclic gear stage).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Although many of the examples described herein are for solar-tracking photovoltaic (PV) systems, the techniques and structures may apply equally to other non-solar-tracking or stationary solar energy collection systems, as well as concentrated thermal solar systems, etc. Moreover, although much of the disclosure is described in terms of ground-mounted solar-tracking solar energy collection installations, the disclosed techniques and structures apply equally to other solar energy collection installations, e.g., rooftop solar installations.

Sun-tracking solar power systems typically include a lack of available space below solar modules for the placement of motor drives to rotate a torque tube. Accordingly, motor drives are ordinarily not placed below the solar modules, because the solar modules would otherwise be likely to contact the motor drives when the solar modules rotate toward the sun. Such contact could damage the solar modules and/or motor drives. The solar modules may be raised to increase a clearance between the solar modules and the motor drives to permit a wider angle of rotation before solar modules contact the motor drive. Doing so, however, could result in a larger torque applied to the torque tube by the rotating solar modules, which may require more robust drive components and increased system costs. Accordingly, solar modules are typically separated along the torque tube by a clearance gap, and the motor drive is placed within the clearance gap to allow the solar module to rotate without contacting the motor drive. The clearance gap, however, reduces total land utilization of the solar system, e.g., by as much as 6%. Therefore, current solutions for integrating motor drives into solar-tracking solar power systems leave a choice between reducing land utilization, reducing a range of motion of the solar modules, or increasing system costs.

In an aspect, a motor drive may be coupled to a torque tube of a solar-tracking PV system to rotate PV modules toward a solar source. The motor drive may include a gearbox coupled to a gearmotor, and the gearmotor may have an offset gear used to separate a power output axis and a power input axis of the gearmotor. More particularly, the power input axis may be offset vertically below the power output axis, such that a motor inputting power to the motor drive may be spaced apart from the torque tube. Accordingly, additional clearance may be gained between the PV modules and the gearmotor to allow the PV modules to rotate toward the sun without contacting the motor drive. As described below, the gearmotor of the motor drive may be realized in a compact design using an offset gear to separate the power axes and to provide substantial gear reduction directly at the motor where gear tooth strength is not an issue.

The aspects described above may be realized by the motor drive disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of actuators or techniques for coupling such actuators with system components, are not described in detail in order to not unnecessarily obscure embodiments of the present disclosure. Furthermore, it is to be understood that the various embodiments shown in the figures are illustrative representations and are not necessarily drawn to scale.

By way of summary, a solar-tracking PV system may include a PV module mounted on a torque tube, and a motor drive to rotate the torque tube about a longitudinal axis such that the PV module tracks a solar source. The motor drive may include a gearbox and a gearmotor. Both the gearbox and the gearmotor may be disposed along a vertical plane below the PV module. In an embodiment, the gearbox includes a worm drive having a worm disposed along a worm axis. The worm axis may be below a PV laminate of the PV module. The gearmotor may include a planetary gear train, an offset gear, and a motor assembly. In an embodiment, the motor assembly has a pinion gear mounted on an output shaft of a motor along a shaft axis. The shaft axis may be below the PV laminate of the PV module. The pinion gear may drive the offset gear, and the offset gear may drive the planetary gear train and the worm drive to rotate the torque tube. The offset gear may allow for the shaft axis to be offset below the worm axis, such that the PV module does not contact the motor drive when it rotates with the torque tube.

Figure 1:
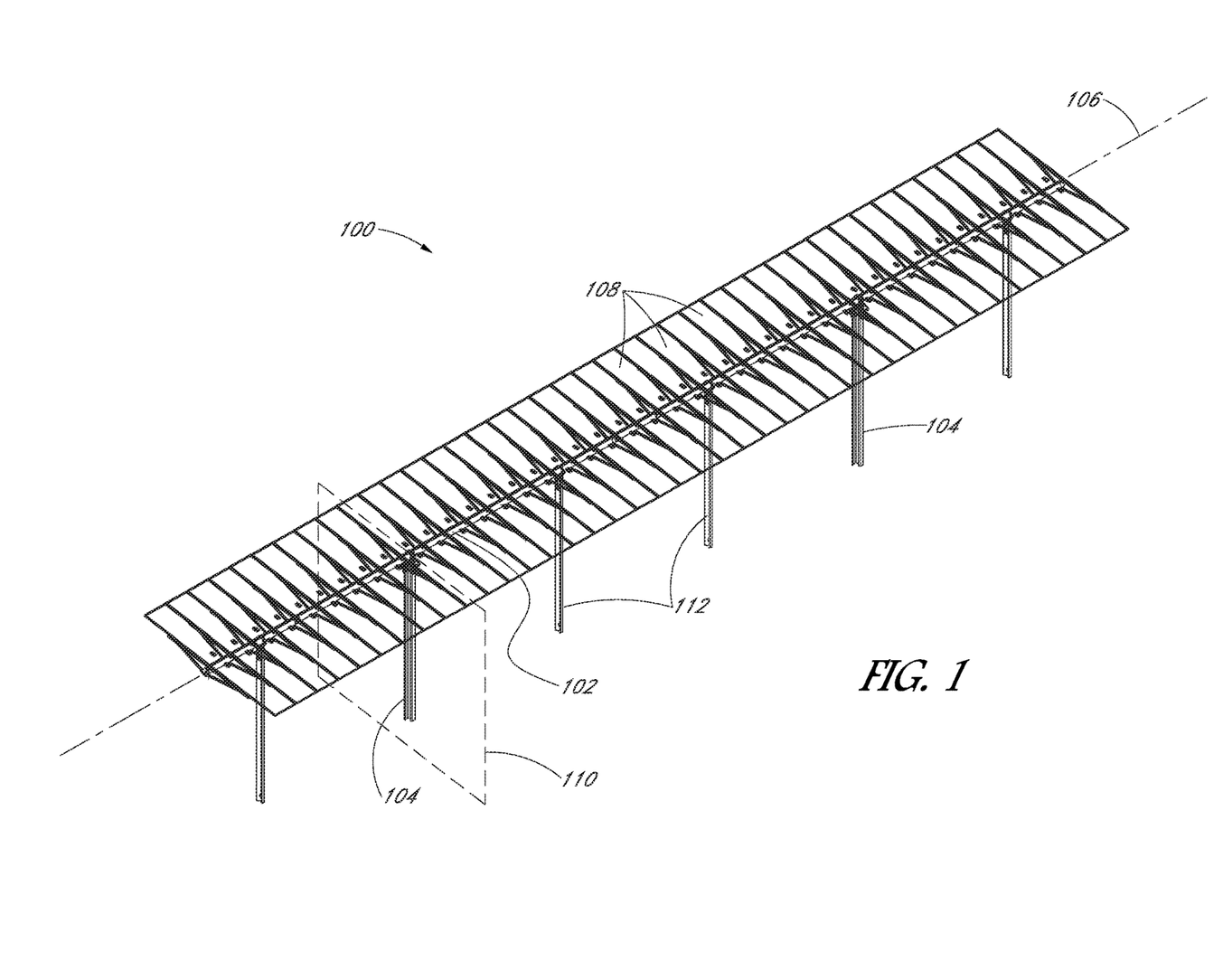
FIG. 1 illustrates a perspective view of a solar-tracking photovoltaic (PV) system, in accordance with an embodiment of the present disclosure.

Referring to FIG. 1, a perspective view of a solar-tracking photovoltaic (PV) system is shown in accordance with an embodiment of the present disclosure. An electricity farm may include one or more solar-tracking PV systems 100. Solar-tracking PV system 100 may be considered a multi-drive system because several motor drives may be coupled to a same torque member to input torque to the torque member at longitudinally separated locations. For example, solar-tracking PV system 100 may be a dual-drive system having a pair of motor drives coupled to respective ends of a same torque tube 102, or torque tube section. In an embodiment, solar-tracking PV system 100 includes several driven support assemblies 104 supporting torque tube 102 above the ground at the longitudinally separated locations. Torque tube 102 may extend along a longitudinal axis 106. Thus, solar-tracking PV system 100 may include a first driven support assembly 104 longitudinally separated from a second driven support assembly 104 in a direction of longitudinal axis 106.

Several PV modules 108 may be mounted on torque tube 102 along longitudinal axis 106. For example, solar-tracking PV system 100 may include a row of tens of PV modules 108 arranged in a series. The series may include, for example, 70-100 PV modules 108 between a first outward end and a second outward end. Each PV module 108 may include one or more solar collecting devices. For example, each PV module 108 may include a PV laminate mounted on a PV frame. The PV laminates may be configured to receive sunlight for conversion into electrical energy. For example, the PV laminates may include one or more PV cells laminated between an optically transparent upper cover and/or back cover.

Each PV frame may support a respective PV laminate along an outer perimeter and/or a back surface of the laminate structure. The PV frame may in turn be mounted on torque tube 102. Thus, the PV laminate may be mounted vertically above torque tube 102 to track a solar source, e.g., the sun or a reflective surface redirecting sunrays toward PV modules 108, when torque tube 102 rotates about longitudinal axis 106.

In an embodiment, drive support assembly 104 is located directly below a PV module 108. More particularly, a vertical plane 110 may extend through the PV laminate orthogonal to longitudinal axis, and vertical plane 110 may further extend through a motor drive of driven support assembly 104. Accordingly, the motor drive, rather than being disposed with a longitudinal gap between spaced-apart solar modules, is located directly below PV module 108 and within a path of rotation of PV module 108 as the PV laminate rotates about longitudinal axis 106 on torque tube 102. As described below, however, the motor drive may have drive components spaced far enough below PV laminate and longitudinal axis 106 so as to avoid contact between the motor drive and the rotating PV laminate.

In an embodiment, torque tube 102 is supported above the ground by one or more non-driven support assemblies 112. For example, a non-driven support assembly 112 may be positioned longitudinally between the first driven support assembly 104 and the second driven support assembly 104. Each non-driven support assembly 112 along longitudinal axis 106 of torque tube 102 may support and allow for rotation of torque tube 102 about the longitudinal axis 106 without inputting torque to torque tube 102. Thus, non-driven support assemblies 112 may facilitate a stable rotation of torque tube 102 without actually driving such rotation.

Figure 2:
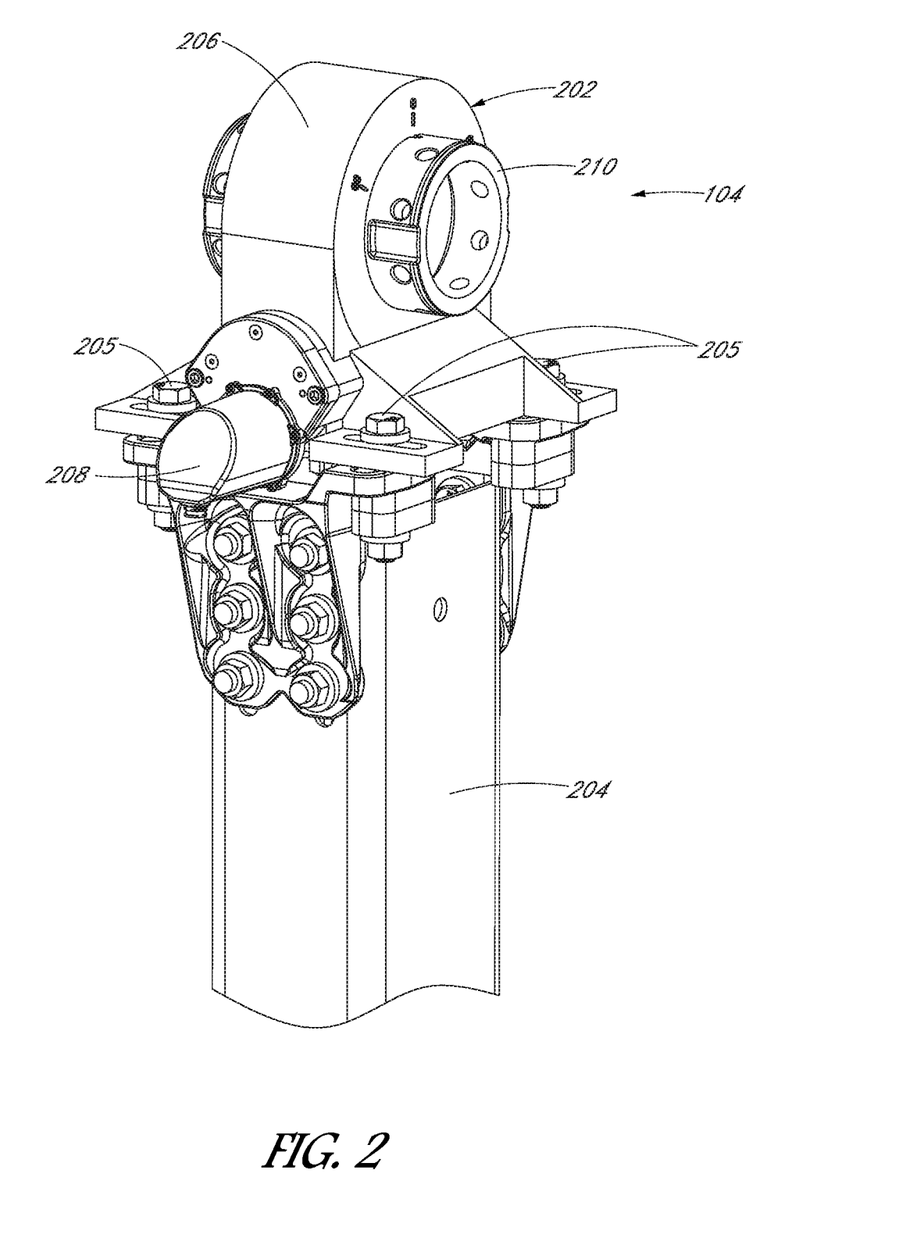
FIG. 2 illustrates a perspective view of a driven support assembly, in accordance with an embodiment of the present disclosure.

Referring to FIG. 2, a perspective view of a driven support assembly is shown in accordance with an embodiment of the present disclosure. Driven support assemblies 104 may affect rotation of torque tube 102 about longitudinal axis 106 based on electrical inputs provided or controlled by a controller (not shown). The controller may include a microprocessor or computer configured to control the delivery of electrical power to motors of driven support assemblies 104 to input torque along torque tube 102. For example, the controller may directly or indirectly, e.g., through control of a power supply, deliver an electrical power input to a motor drive 202 of a first driven support assembly 104 and/or to another motor drive 202 of a second driven support assembly 104. Accordingly, respective motors of the motor drives 202 may be simultaneously controlled by the controller to input torque to one or more locations along torque tube 102. Thus, torque tube 102 may pivot or rotate about longitudinal axis 106 such that PV modules 108, mounted on torque tube 102, track the solar source.

Each driven support assembly 104 may include motor drive 202 mounted on a supportive stand, such as a drive pile 204. Drive pile 204 may be a columnar structure, such as an I-beam, having a lower end driven into the ground, and an upper end supporting motor drive 202 and configured to provide a mechanical torque to torque tube 102. Each non-driven support assembly 112 may include a supportive stand, i.e., a non-drive pile, having a similar structure to drive pile 204. For example, a non-drive pile may be a columnar structure such as an I-beam, or a post having a round or rectangular cross-sectional profile. The columnar structure of the non-drive pile may be different than drive pile 204, however. For example, the non-drive pile may include a different beam type including a different cross-sectional geometry having a web portion and a flange portion, e.g., a "C" or "Z" shaped profile. Each non-drive pile may carry a respective supportive mechanism, such as a bearing assembly, to support torque tube 102.

In an embodiment, motor drive 202 may be fixed to the upper end of drive pile 204. For example, one or more fastener joint 205, such as a bolted joint, may be used to attach motor drive 202 to drive pile 204. Motor drive 202 may include a gearbox 206 and a gearmotor 208. Gearbox 206 may transmit an input torque from gearmotor 208 to a torque tube coupling 210. Accordingly, gearbox 206 may include a gear set to convert an input rotational power from gearmotor 208 along a first axis into an output rotational power at output coupling along longitudinal axis 106 orthogonal to the first axis.

Figure 3:
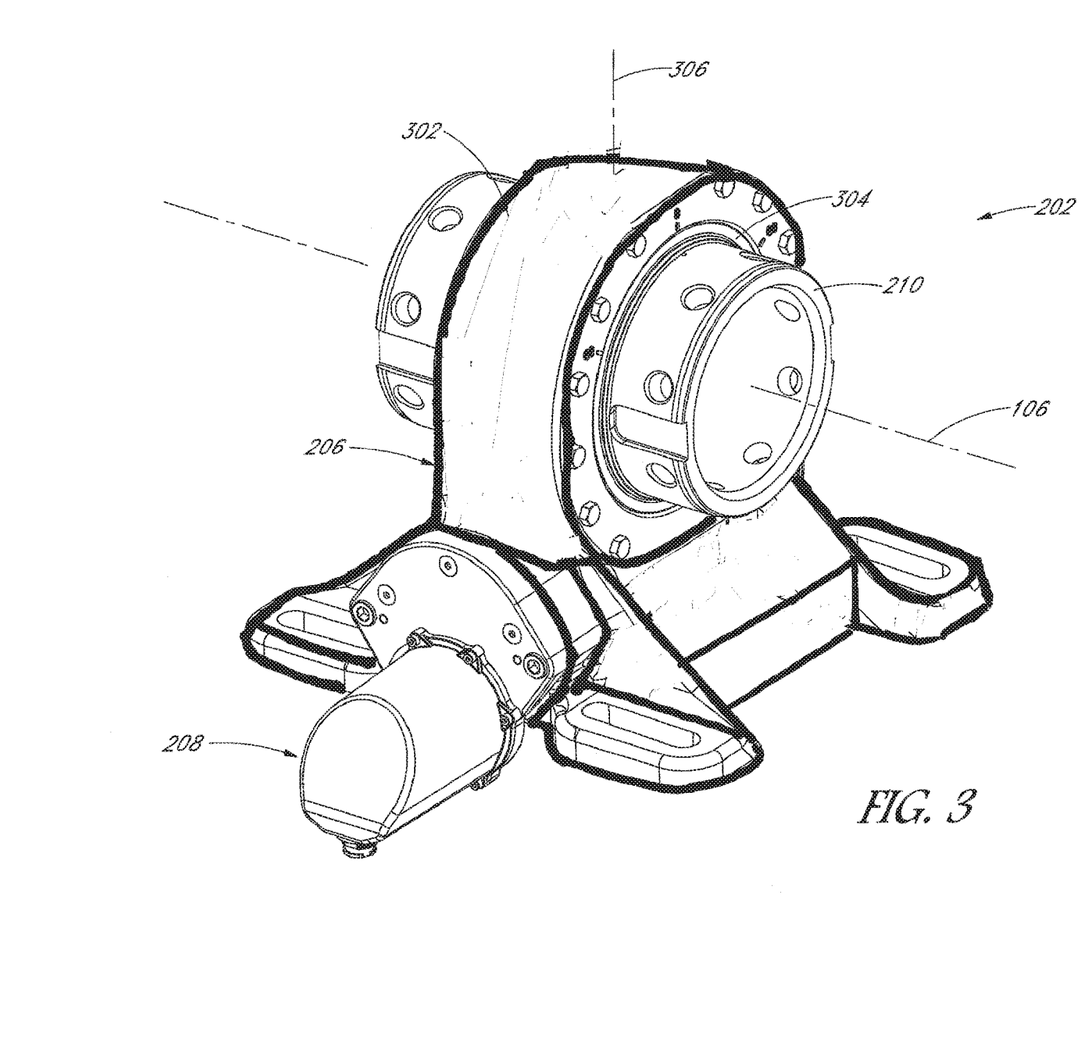
FIG. 3 illustrates a perspective view of a motor drive, in accordance with an embodiment of the present disclosure.

Referring to FIG. 3, a perspective view of a motor drive is shown in accordance with an embodiment of the present disclosure. Gearbox 206 of motor drive 202 may include a gearbox housing 302, and torque tube coupling 210 of motor drive 202 may rotate about longitudinal axis 106 relative to gearbox housing 302. For example, torque tube coupling 210 and gearbox housing 302 may be coupled to respective surfaces of an output bearing 304 that allows for relative rotational movement between gearbox housing 302 and torque tube coupling 210 about longitudinal axis 106. In an embodiment, a shared central point of gearbox housing 302 and torque tube coupling 210 may be used as a point of reference. More particularly, the shared central point may be a reference point within an inner lumen of torque tube coupling 210 and gearbox housing 302 where longitudinal axis 106 intersects a vertical axis 306.

Figure 4:
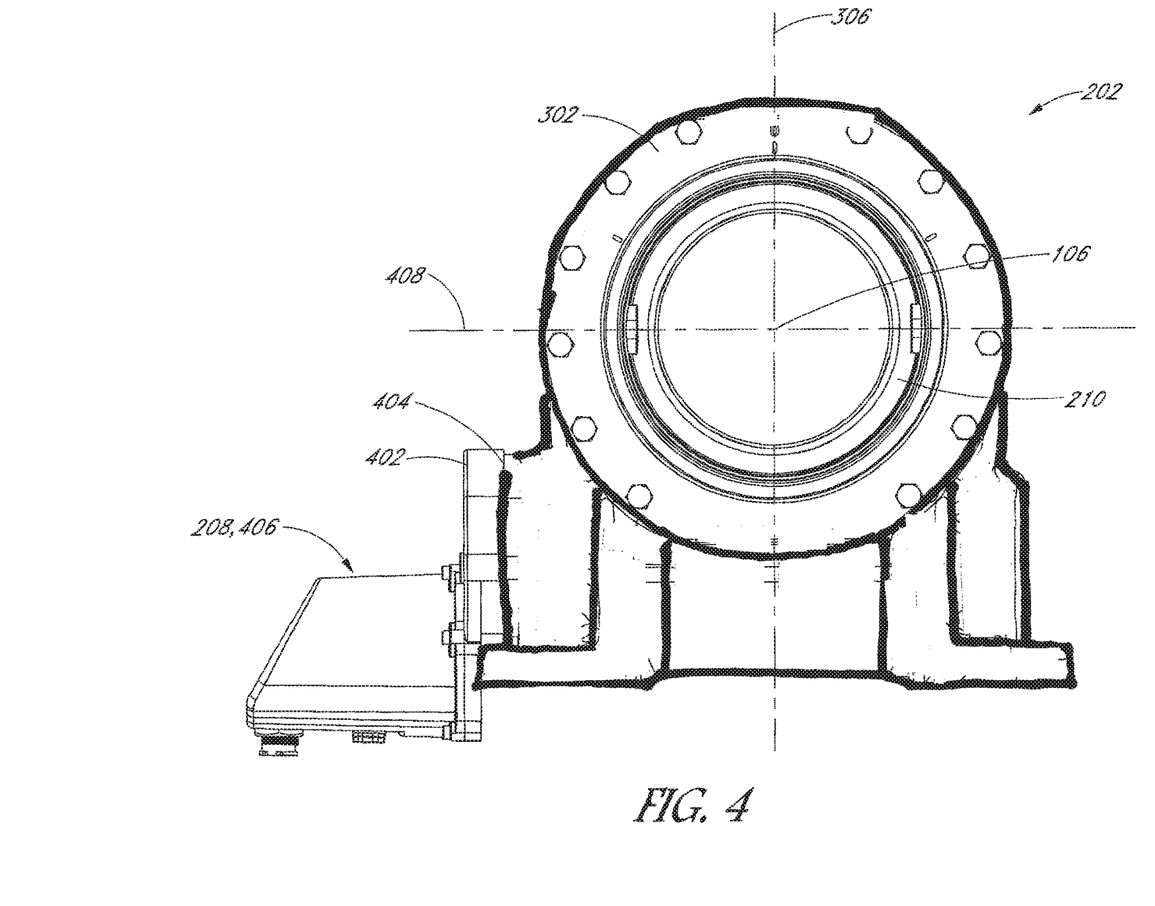
FIG. 4 illustrates an end view of a motor drive, in accordance with an embodiment of the present disclosure.

Referring to FIG. 4, an end view of a motor drive is shown in accordance with an embodiment of the present disclosure. In an embodiment, gearmotor 208 may be located entirely on one side of a plane containing longitudinal axis 106 and vertical axis 306. For example, gearmotor 208 may include a housing mount 402 attached to gearbox housing 302 at a point laterally offset from the plane, e.g., on an input mounting wall 404. Similarly, a motor assembly 406 of gearmotor 208 may be attached to an opposite side of housing mount 402 than gearbox housing 302. Gearmotor 208 may include a planetary gear train and an offset gear (not shown) mounted between housing mount 402 and gearbox housing 302 on the same side of the plane as motor assembly 406.

Additional reference geometries may be established to define relative locations of the motor drive 202 components. For example, a lateral axis 408 may extend orthogonal to both longitudinal axis 106 and vertical axis 306. Vertical plane 110 may contain lateral axis 408 and vertical axis 306, and may be orthogonal to longitudinal axis 106 as described above with respect to FIG. 1. Accordingly, vertical plane 110 may provide a plane of symmetry bisecting motor drive 202 and gearmotor 208 into mirrored portions. For example, vertical plane 110 may extend through a middle of housing mount 402 and motor assembly 406, as shown in FIG. 3. As described above, vertical plane 110 may intersect PV module 108 located above motor drive 202, and thus, motor drive 202, including housing mount 402 and motor assembly 406, may be located below PV module 108.

Figure 5:
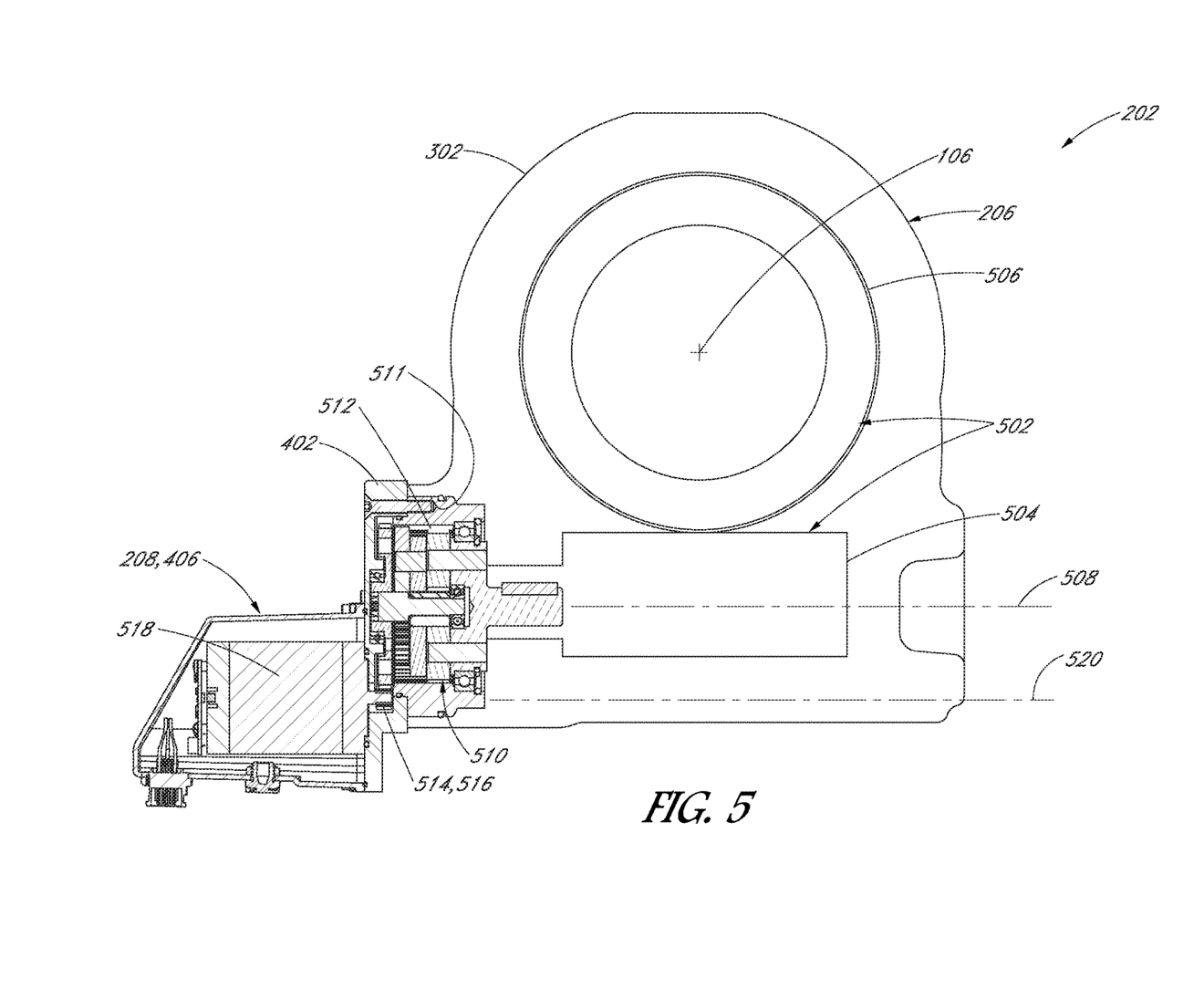
FIG. 5 illustrates a section view of a motor drive, in accordance with an embodiment of the present disclosure.

Referring to FIG. 5, a section view of a motor drive is shown in accordance with an embodiment of the present disclosure. Gearbox 206 of motor drive 202 may include a worm drive 502 to transmit power from gearmotor 208 to torque tube coupling 210. More particularly, worm drive 502 may be coupled to torque tube 102 by torque tube coupling 210 (FIG. 4). Worm drive 502 may include a worm 504 (drawn schematically) to receive input torque from gearmotor 208, and a worm gear 506 (drawn schematically) to output transmitted torque to torque tube coupling 210. Worm 504 and worm gear 506 may be constructed as is known in the art, and thus, particular description of the components is omitted in the interest of brevity. It will be appreciated, however, that worm 504 may rotate about a worm axis 508, and worm gear 506 may rotate about longitudinal axis 106. Accordingly, worm axis 508 may be below longitudinal axis 106, and correspondingly, below torque tube 102.

In an embodiment, gearmotor 208 includes a planetary gear train 510 coupled to worm 504. For example, planetary gear train 510 may be disposed within a mounting cavity 512 of gearbox housing 302. That is, a cavity wall 511 may extend around mounting cavity 512 about worm axis 508, and an output of planetary gear train 510 may be coupled to worm 504 within mounting cavity 512. Thus, planetary gear train 510 may be supported by housing mount 402 within mounting cavity 512 along worm axis 508.

As described below, gearmotor 208 may include an offset gear (not shown) coupled to planetary gear train 510, and coupled to a pinion gear 514 of motor assembly 406. For example, motor assembly 406 may include pinion gear 514 mounted on an output shaft 516 of a motor 518, and the offset gear may transmit mechanical power from pinion gear 514 to planetary gear train 510. Output shaft 516 may extend along vertical plane 110, and planetary gear train 510 may extend along vertical plane 110. For example, worm axis 508 and shaft axis 520 may be contained within vertical plane 110, and thus planetary gear train 510 and output shaft 516 may be aligned along vertical plane 110. Furthermore, planetary gear train 510 may be vertically above shaft axis 520 within vertical plane 110. Accordingly, output shaft 516 may rotate about shaft axis 520 offset below worm axis 508. For example, shaft axis 520 may be offset below worm axis 508 by a distance equal to a radius of the offset gear plus a radius of pinion gear 514. As such, the offset gear described below lowers motor assembly 406 relative to worm drive 502, and increases a clearance between motor assembly 406 and PV module 108 mounted on torque tube 102.

Figure 6:
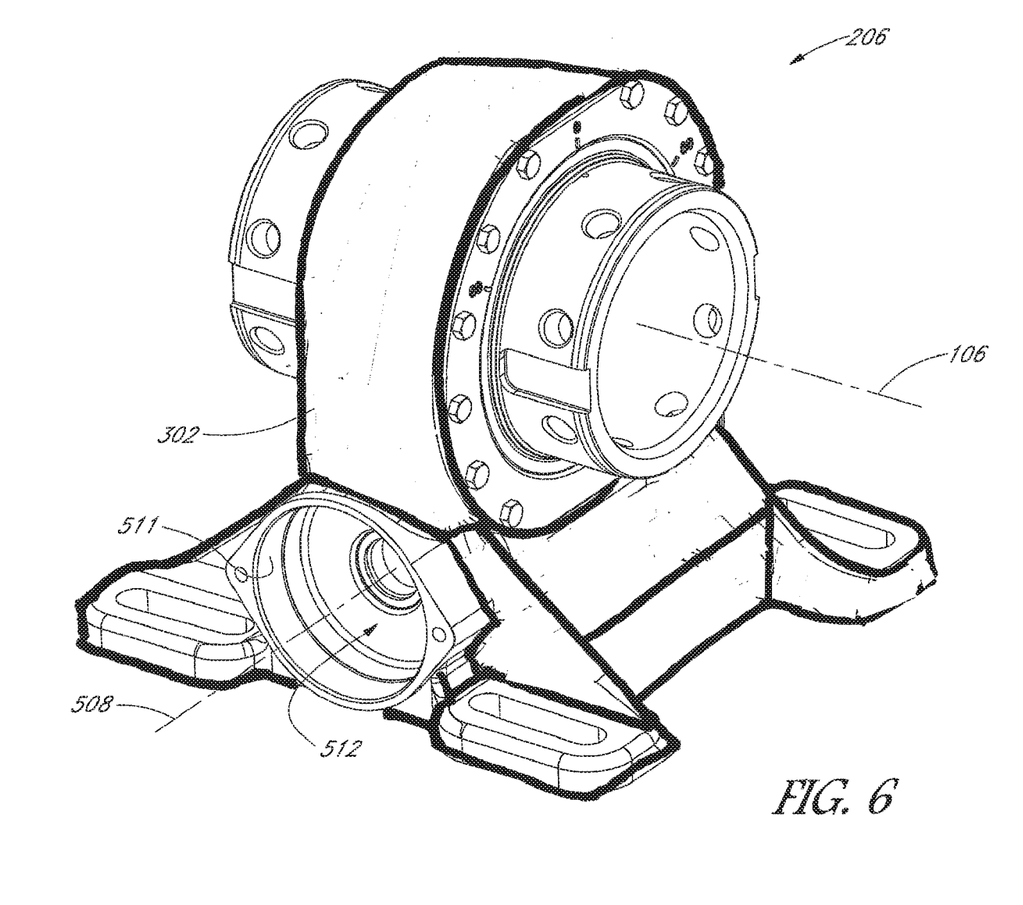
FIG. 6 illustrates a perspective view of a gearbox, in accordance with an embodiment of the present disclosure.

Referring to FIG. 6, a perspective view of a gearbox is shown in accordance with an embodiment of the present disclosure. When gearmotor is removed from gearbox 206, mounting cavity 512 surrounded by cavity wall 511 is exposed. Mounting cavity 512 may provide a recessed volume within gearbox housing 302 to receive a portion of gearmotor 208, e.g., planetary gear train 510 and/or the offset gear. A planetary gear set provides an efficient way to achieve gear reduction in a small space. Accordingly, gearbox 206 may be realized in a small form factor. That is, gearbox 206 may be compact at least in part because planetary gear train 510 is disposed within the recessed volume of gearbox housing 302. As shown, worm axis 508 may extend through mounting cavity 512, and thus, planetary gear train 510 may be concentrically disposed about worm axis 508 vertically below longitudinal axis 106.

Figure 7:
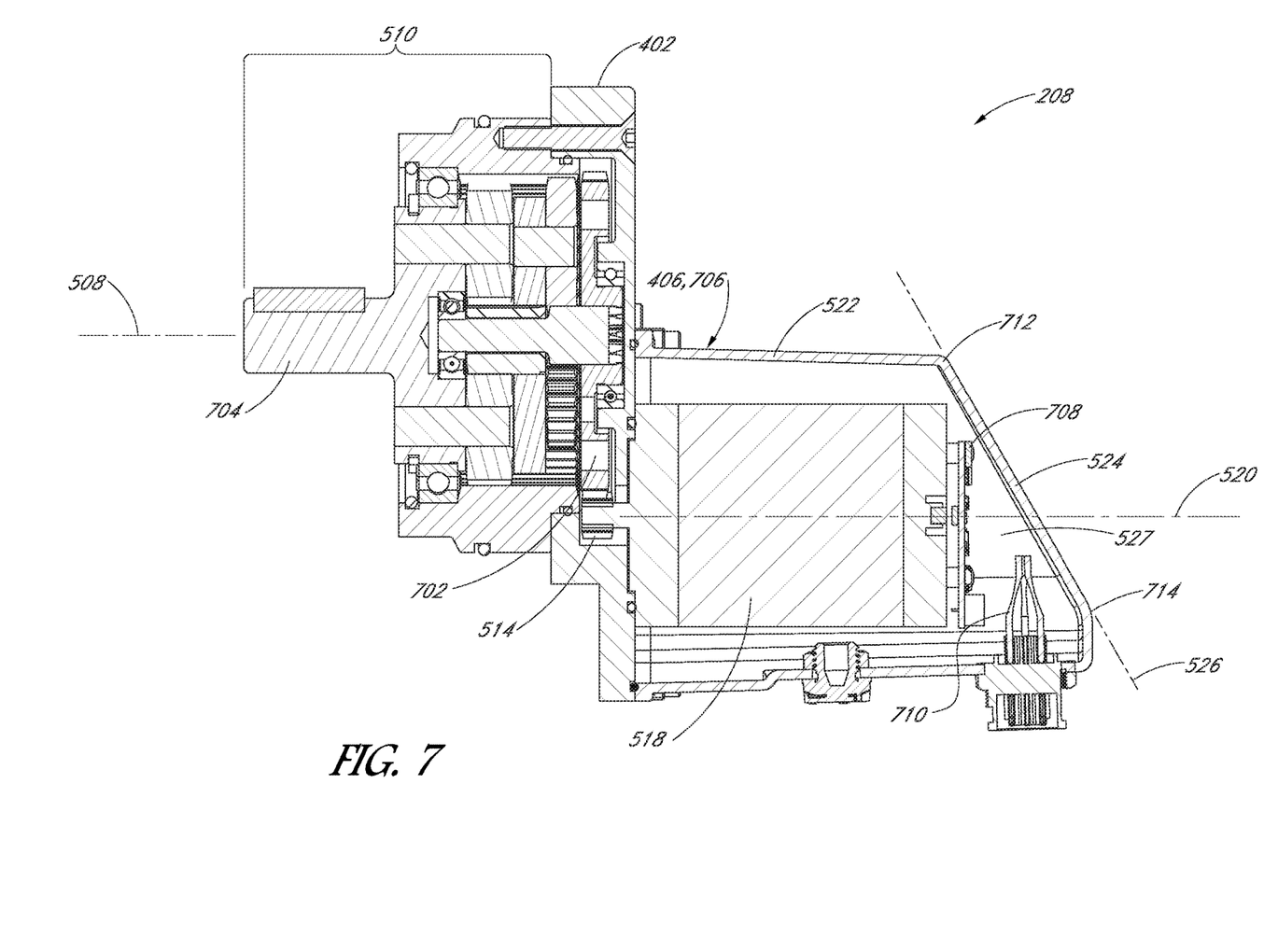
FIG. 7 illustrates a section view of a gearmotor, in accordance with an embodiment of the present disclosure.

Referring to FIG. 7, a section view of a gearmotor 208 is shown in accordance with an embodiment of the present disclosure. Gearmotor 208 may include an offset gear 702 disposed between pinion gear 514 and planetary gear train 510. More particularly, pinion gear 514 may mesh with a first portion, e.g., an external gear, of offset gear 702, and an input gear of planetary gear train 510 may mesh with a second portion, e.g., an internal gear, of offset gear 702. Thus, offset gear 702 may be coupled to planetary gear train 510 along worm axis 508, and offset gear 702 may be coupled to pinion gear 514 along shaft axis 520. Accordingly, pinion gear 514 may mesh with offset gear 702 to transmit torque to an output carrier 704 along worm axis 508 from a motor 518 below worm axis 508.

Clearance between PV module 108 and motor assembly 406 of gearmotor 208 may be increased by the vertical offset between worm axis 508 and shaft axis 520, as described above. A geometry of gear motor 518 may also contribute to the increased clearance. Motor assembly 406 may include a motor cover 706 mounted on housing mount 402. Motor cover 706 may surround motor 518 to isolate and protect other motor assembly 406 components, such as motor 518, a printed circuit board (PCB) 708 used to control motor 518, a controller connector 710, etc. In an embodiment, motor cover 706 is shaped to maximize an angle of rotation permitted by PV module 108 before the PV laminate of PV module 108 contacts gearmotor 208.

Motor cover 706 may include a sidewall 522 extending around shaft axis 520. For example, sidewall 522 may have a cylindrical outer contour enclosing motor 518. In an embodiment, motor cover 706 includes a rear wall 524 extending along a rear plane 526. Rear wall 524 may effectively cap sidewall 522, to form an enclosed space between rear wall 524, sidewall 522, and housing mount 402. A portion of the enclosed space between a back surface of motor 518 and an inner surface of rear wall 524 may be referred to as a cover cavity 527. Cover cavity 527 may include a volume distributed disproportionately toward a bottom side of sidewall 522. That is, more of the volume of cover cavity 527 may be distributed farther from worm axis 508 and/or below shaft axis 520. As such, larger electronic components of PCB 708, controller connector 710, and other components of motor assembly 406 may be housed within cover cavity 527 below shaft axis 520.

In an embodiment, rear plane 526 may be oblique to shaft axis 520 to form the disproportionately distributed cover cavity 527. For example, rear wall 524 may be tilted toward the plane containing vertical axis 306 and longitudinal axis 106 to form the unevenly distributed cover cavity 527. In addition to being shaped to form cover cavity 527, however, the slanted orientation of rear wall 524 may be such that, when PV module 108 is rotated to a maximum angle about longitudinal axis 106, a front or back surface of the PV laminate may be parallel to rear wall 524. That is, rear wall 524 may conform to the PV laminate surface when PV module 108 is in a fully rotated position. Thus, an angle that PV module 108 may rotate about longitudinal axis 106 before contacting rear wall 524 may be greater than the angle would be if rear wall 524 were oriented vertically. It will be appreciated that this is so because a distance between an upper edge 712 of rear wall 524 and vertical axis 306 is less than a distance between vertical axis 306 and lower edge 714.

Figure 8:
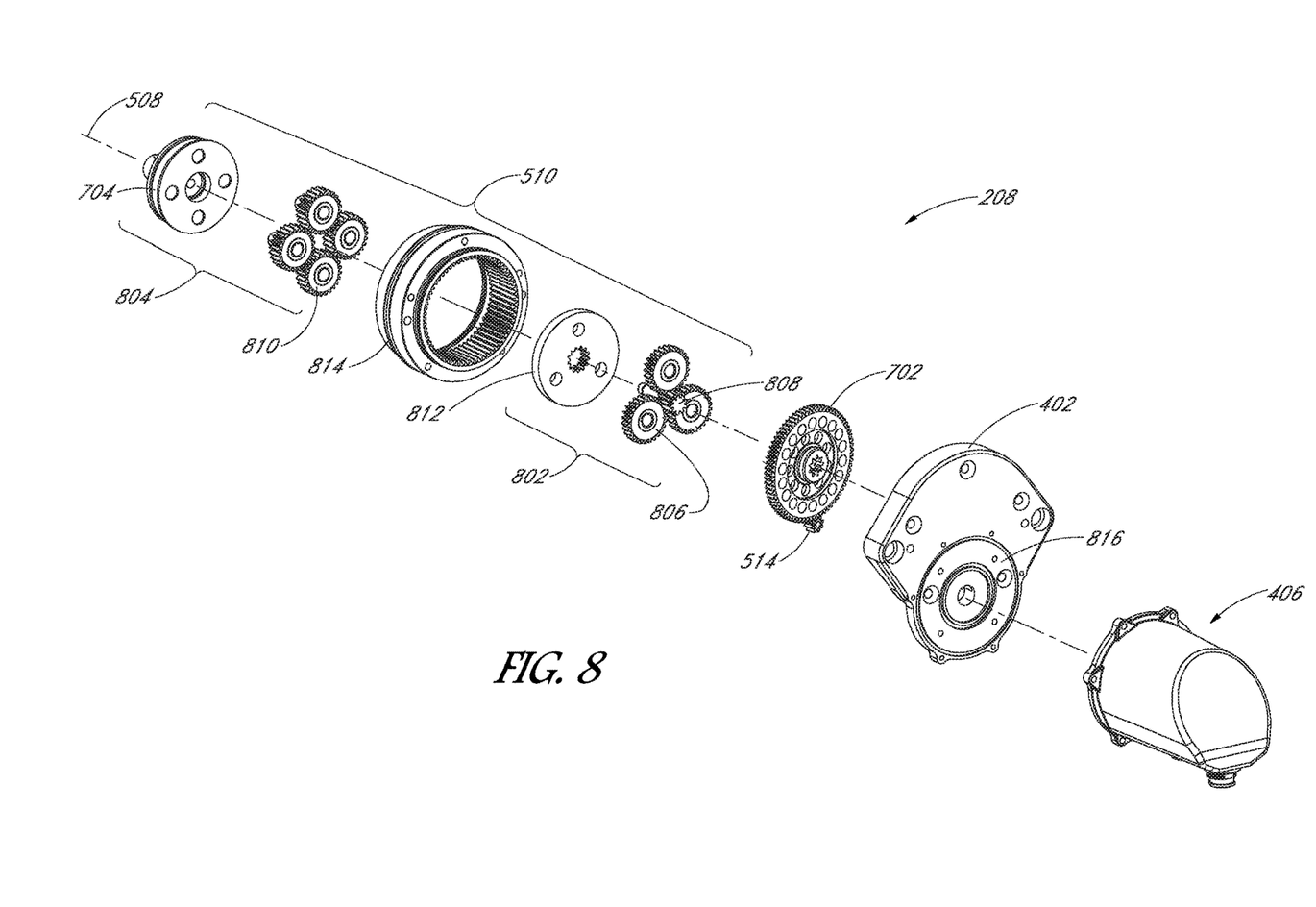
FIGS. 8-9 illustrate exploded views of a gearmotor, in accordance with an embodiment of the present disclosure.

Referring to FIG. 8, an exploded view of a gearmotor is shown in accordance with an embodiment of the present disclosure. Gearmotor 208 may include planetary gear train 510 having several epicyclic gear stages mounted along worm axis 508. For example, planetary gear train 510 may be a two-stage planetary gear set having a first epicyclic gear stage 802 axially aligned with a second epicyclic gear stage 804 along worm axis 508. First epicyclic gear stage 802 may include several first planet gears 806. For example, first planet gears 806 of the first stage may incorporate three evenly spaced planet gears configured to revolve around a first stage sun gear 808. Similarly, second planet gears 810 of the second stage may incorporate four evenly spaced planet gears configured to revolve around a corresponding sun gear.

The sun gears and planet gears may be supported by respective carriers. For example, a first carrier 812 may hold and/or be driven by first planet gears 806, and output carrier 704 may hold and/or be driven by second planet gears 810. The planetary gear train 510 stages may further be engaged with a planetary housing 814. Planetary housing 814 may include an internal ring gear. Accordingly, planetary housing 814 may remain fixed relative to housing mount 402, and the planet gears and sun gears may rotate within planetary housing 814 to transmit mechanical power from offset gear 702 to worm 504. More particularly, motor assembly 406 may be mounted on a lower flange 816 of a first side of housing mount 402. Motor 518 may drive pinion gear 514, which may in turn drive offset gear 702 on another side of housing mount 402 to rotate first stage sun gear 808. First stage sun gear 808 may likewise drive the other gears of planetary gear train 510 such that output carrier 704 spins to drive worm 504.

Figure 9:
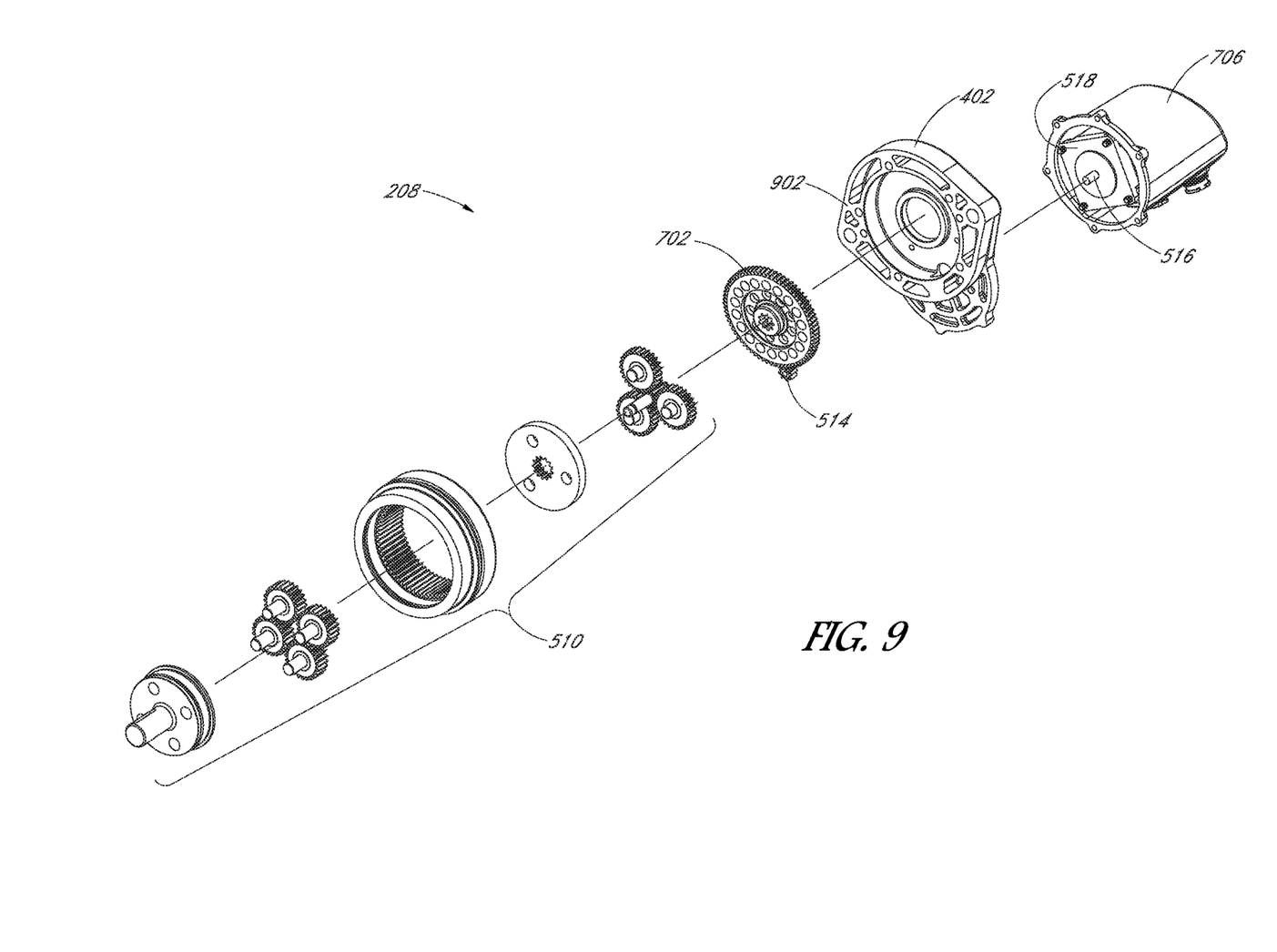

Referring to FIG. 9, an exploded view of a gearmotor is shown in accordance with an embodiment of the present disclosure. Housing mount 402 of gearmotor 208 may include an upper flange 902 on an opposite side from lower flange 816. More particularly, whereas motor cover 706 and/or motor 518 may be mounted on lower flange 816, upper flange 902 may be mounted on input mounting wall 404 of gearbox housing 302. Accordingly, upper flange 902 may support planetary gear train 510 relative to gearbox housing 302.

In an embodiment, output shaft 516 of motor 518 extends through lower flange 816 from the side on which motor 518 is mounted to the side of housing mount 402 on which offset gear 702 is located. For example, pinion gear 514 may be aligned with offset gear 702 on a same side of lower flange 816 as planetary gear train 510, and output shaft 516 may extend between motor 518 and pinion gear 514.

Figure 10:
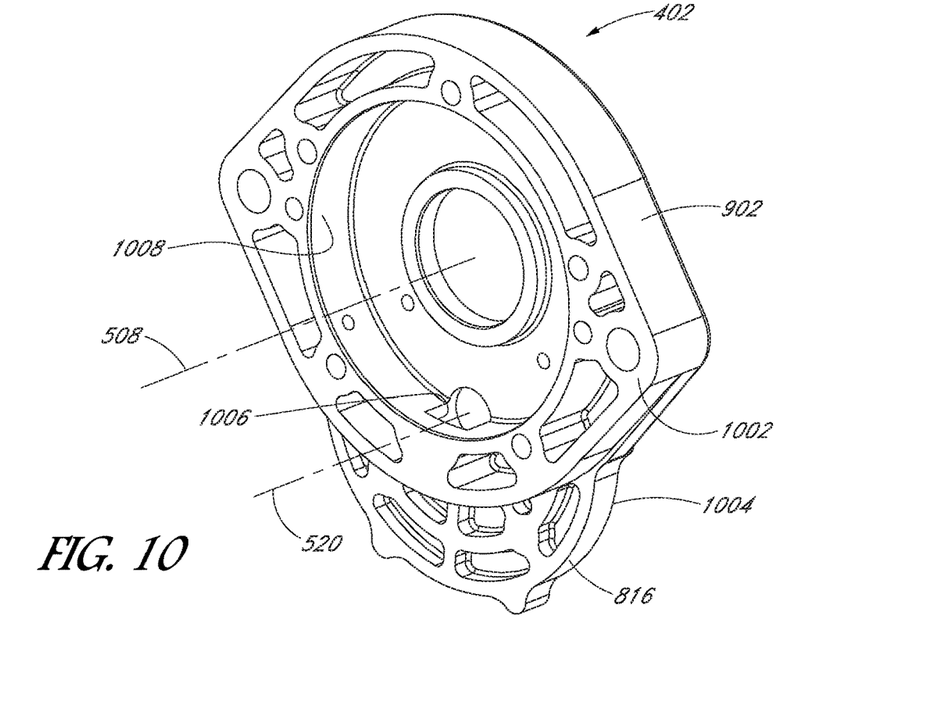
FIG. 10 illustrates a perspective view of a housing mount, in accordance with an embodiment of the present disclosure.

Referring to FIG. 10, a perspective view of a housing mount is shown in accordance with an embodiment of the present disclosure. Housing mount 402 may perform several functions. For example, housing mount 402 may support planetary gear train 510. Housing mount 402 may support one or more component of motor assembly 406, e.g., motor 518 and/or motor cover 706. Housing mount 402 may support planetary gear train 510 and the one or more components of motor assembly 406 in a vertically offset relationship. Furthermore, housing mount 402 may mount on gearbox 206 to fix gearmotor 208 relative to gearbox 206.

In an embodiment, housing mount 402 includes upper flange 902 symmetrically disposed about worm axis 508, and lower flange 816 symmetrically disposed about shaft axis 520. In addition to being vertically offset from one another, upper flange 902 and lower flange 816 may be configured to mount to different portions of gearmotor 208. For example, upper flange 902 may have a front mounting surface 1002 configured to attach to planetary housing 814, and lower flange 816 may have a rear mounting surface 1004 configured to attach to motor cover 706 and/or motor 518. Upper flange 902 may also include fastener holes to allow front mounting surface 1002 to be mounted on gearbox 206, e.g., on input mounting wall 404.

Given that planetary gear train 510 and offset gear 702 may be disposed on an opposite side of housing mount 402 from motor 518, housing mount 402 may be configured to allow for mechanical power to be transmitted from one side to another side. As described above, output shaft 516 of motor 518 may extend through lower flange 816 to engage with offset gear 702. More particularly, output shaft 516 and pinion gear 514 may extend through a gear slot 1006 formed in rear mounting surface 1004 such that pinion gear 514 is aligned with an offset cavity wall 1008 surrounding offset gear 702. That is, offset cavity wall 1008 may define a cavity in which offset gear 702 is received, and a plane extending through the cavity and parallel to front mounting surface 1002 may pass through both offset gear 702 and pinion gear 514. Accordingly, pinion gear 514 may mesh with offset gear 702 to transmit power from output shaft 516 to planetary gear train 510.

Figure 11:
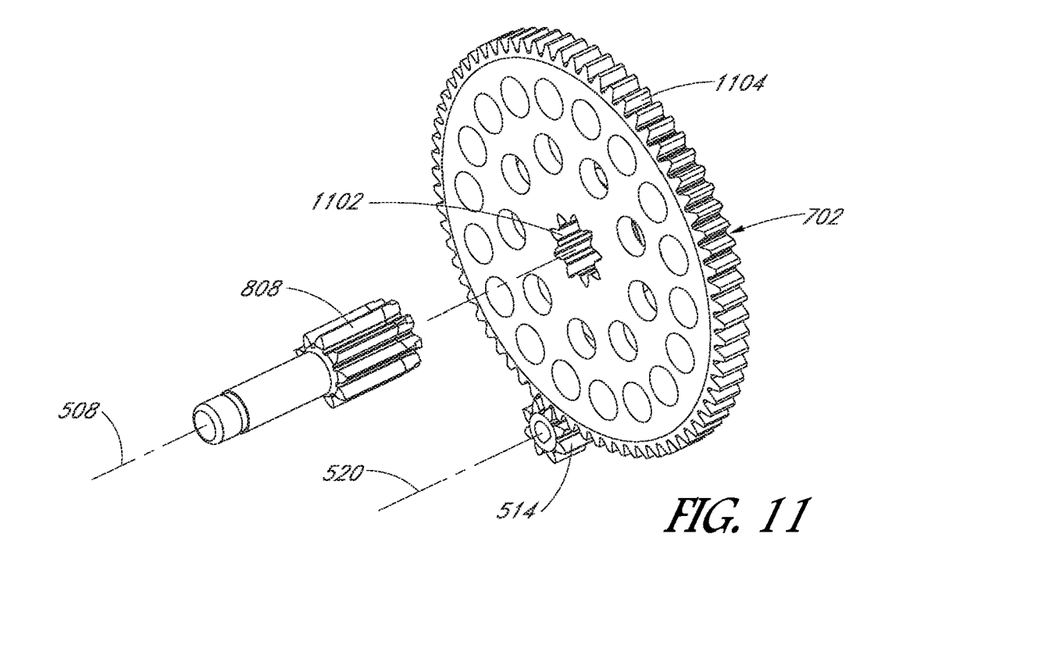
FIG. 11 illustrates a perspective view of an offset gear, in accordance with an embodiment of the present disclosure.

Referring to FIG. 11, a perspective view of an offset gear is shown in accordance with an embodiment of the present disclosure. Offset gear 702 may be configured to engage with both planetary gear train 510 and pinion gear 514. Offset gear 702 may include an internal gear portion 1102 and an external gear portion 1104. In an embodiment, internal gear portion 1102 is coupled to planetary gear train 510 along worm axis 508. For example, first stage sun gear 808 may mesh with internal gear portion 1102 of offset gear 702 along worm axis 508, and pinion gear 514 may mesh with external gear portion 1104 of offset gear 702 along shaft axis 520. Thus, when pinion gear 514 rotates counterclockwise about shaft axis 520, offset gear 702 and first stage sun gear 808 rotate clockwise about worm axis 508. The gear portions of offset gear 702 may have a same gear type. For example, external gear portion 1104 and internal gear portion 1102 may both include spur gear types. Alternatively, the gear portions may have a different gear type. For example, external gear portion 1104 may include a helical gear type, and internal gear portion 1102 may include a spur gear type. Other gear types may be used for one or more of the offset gear portions.

In an embodiment, external gear portion 1104 includes a bevel gear. The use of a bevel gear may allow output shaft 516 to extend along an axis perpendicular to an axis about which offset gear 702 rotates. More particularly, output shaft 516 may rotate about shaft axis 520 orthogonal to worm axis 508. It will be appreciated then, that at least a portion of gearmotor 208, e.g., motor assembly 406, may extend orthogonal to lateral axis. For example, a lengthwise dimension of motor assembly 406 may extend vertically downward, or longitudinally forward or backward, relative to housing mount 402. In any case, motor assembly 406 and shaft axis 520 may be vertically offset below offset gear 702 and worm axis 508, and thus, additional clearance between PV module 108 and motor assembly 406 may be gained.

In addition to providing a vertical offset between planetary gear train 510 and motor 518, offset gear 702 may also allow for a gear reduction between motor 518 and planetary gear train 510. For example, pinion gear 514 may have eight gear teeth and external gear portion 1104 of offset gear 702 may have 70 gear teeth, resulting in a gear reduction ratio of 8.8. Such gear reduction afforded by offset gear 702 is substantial, and may allow for an omission of an additional planetary gear stage along worm axis 508. That is, offset gear 702 may replace another planetary gear stage. Furthermore, the clearance between PV module 108 and the motor drive 202 provided by offset gear 702 may be advantageous over having another planetary gear stage along worm axis 508.

It will be appreciated that motor 518 may be a rotary actuator of various types. For example, motor 518 may be a stepper motor 518 to allow output shaft 516 to be rotated in predetermined increments under the control of the controller. Thus, precise rotation of torque tube 102 may be performed due to fine control of motor 518 and the gear reduction provided by planetary gear train 510.

A motor drive of a solar-tracking photovoltaic (PV) system has been described. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A solar-tracking photovoltaic (PV) system, comprising:
   a torque tube extending along a longitudinal axis;
   a PV module mounted on the torque tube, wherein the PV module includes a PV laminate above the torque tube to track a solar source when the torque tube rotates about the longitudinal axis;
   a gearbox having a worm drive coupled to the torque tube, wherein the worm drive includes a worm having a worm axis below the torque tube, wherein the worm axis is substantially orthogonal to the longitudinal axis of the torque tube; and
   a gearmotor including
      a planetary gear train coupled to the worm, wherein the planetary gear train includes a sun gear, an offset gear including an internal gear portion coupled to the sun gear of the planetary gear train along the worm axis, and an external gear portion, and a motor assembly including a pinion gear mounted on an output shaft of a motor, wherein the pinion gear meshes with the external gear portion of the offset gear, and wherein the output shaft rotates about a shaft axis below the worm axis;

wherein the gearbox includes a gear set to convert an input rotational power from the gear motor into an output rotational power.

2. The solar-tracking PV system of claim 1, wherein the external gear portion of the offset gear includes a spur gear.

3. The solar-tracking PV system of claim 1, wherein the planetary gear train includes a plurality of epicyclic gear stages mounted along the worm axis.

4. The solar-tracking PV system of claim 1, wherein the motor includes a stepper motor.

5. The solar-tracking PV system of claim 1, wherein the gearbox includes a gearbox housing having a cavity wall extending around a mounting cavity along the worm axis, and wherein the planetary gear train is disposed within the mounting cavity.

6. The solar-tracking PV system of claim 5 further comprising a housing mount, wherein the housing mount includes an upper flange and a lower flange, and wherein the upper flange is mounted on the gearbox housing and supports the planetary gear train within the mounting cavity.

7. The solar-tracking PV system of claim 6 further comprising a motor cover mounted on the lower flange, wherein the motor cover includes a sidewall extending around the shaft axis, and a rear wall extending along a rear plane oblique to the shaft axis.

8. A solar-tracking photovoltaic (PV) system, comprising:
a torque tube extending along a longitudinal axis;
a PV module mounted on the torque tube, wherein the PV module includes a PV laminate above the torque tube to track a solar source when the torque tube rotates about the longitudinal axis;
a gearbox having a worm drive coupled to the torque tube, wherein the worm drive includes a worm having a worm axis below the torque tube, wherein the worm axis is substantially orthogonal to the longitudinal axis of the torque tube, and wherein the PV module is above both the torque tube and the worm drive; and
a gearmotor including
a planetary gear train coupled to the worm, wherein the planetary gear train includes a sun gear,
an offset gear including an internal gear portion coupled to the sun gear of the planetary gear train along the worm axis, and an external gear portion, and
a motor assembly including a pinion gear mounted on an output shaft of a motor, wherein the pinion gear meshes with the external gear portion of the offset gear, and wherein the output shaft rotates about a shaft axis below the worm axis.

9. The solar-tracking PV system of claim 8, wherein the external gear portion of the offset gear includes a spur gear.

10. The solar-tracking PV system of claim 8, wherein the planetary gear train includes a plurality of epicyclic gear stages mounted along the worm axis.

11. The solar-tracking PV system of claim 8, wherein the motor includes a stepper motor.

12. The solar-tracking PV system of claim 8, wherein the gearbox includes a gearbox housing having a cavity wall extending around a mounting cavity along the worm axis, and wherein the planetary gear train is disposed within the mounting cavity.

13. The solar-tracking PV system of claim 12 further comprising a housing mount, wherein the housing mount includes an upper flange and a lower flange, and wherein the upper flange is mounted on the gearbox housing and supports the planetary gear train within the mounting cavity.

14. The solar-tracking PV system of claim 13 further comprising a motor cover mounted on the lower flange, wherein the motor cover includes a sidewall extending around the shaft axis, and a rear wall extending along a rear plane oblique to the shaft axis.

15. A solar-tracking photovoltaic (PV) system, comprising:
a torque tube extending along a longitudinal axis;
a PV module mounted on the torque tube, wherein the PV module includes a PV laminate above the torque tube to track a solar source when the torque tube rotates about the longitudinal axis;
a gearbox having a worm drive coupled to the torque tube, wherein the worm drive includes a worm having a worm axis below the torque tube, wherein the worm axis is substantially orthogonal to the longitudinal axis of the torque tube; and
a gearmotor including
a planetary gear train coupled to the worm, wherein the planetary gear train includes a sun gear,
an offset gear including an internal gear portion coupled to the sun gear of the planetary gear train along the worm axis, and an external gear portion, and
a motor assembly including a pinion gear mounted on an output shaft of a motor, wherein the pinion gear meshes with the external gear portion of the offset gear, and wherein the output shaft rotates about a shaft axis below the worm axis, the shaft axis extending along a vertical plane extending through the PV laminate.

16. The solar-tracking PV system of claim 15, wherein the external gear portion of the offset gear includes a spur gear.

17. The solar-tracking PV system of claim 15, wherein the planetary gear train includes a plurality of epicyclic gear stages mounted along the worm axis.

18. The solar-tracking PV system of claim 15, wherein the motor includes a stepper motor.

19. The solar-tracking PV system of claim 15, wherein the gearbox includes a gearbox housing having a cavity wall extending around a mounting cavity along the worm axis, and wherein the planetary gear train is disposed within the mounting cavity.

* * * * *